United States Patent [19]
Ramsey, Jr.

[11] 4,044,693
[45] Aug. 30, 1977

[54] INFLATABLE DUNNAGE WITH TIE-DOWNS

[75] Inventor: John W. Ramsey, Jr., Benton, Ark.

[73] Assignee: Guardpack, Incorporated, Sheridan, Ark.

[21] Appl. No.: 666,259

[22] Filed: Mar. 12, 1976

[51] Int. Cl.² .................. B61D 45/00; B65D 57/00; B65D 81/10; B65G 1/14
[52] U.S. Cl. .................................. 105/468; 105/496; 206/522; 214/10.5 D
[58] Field of Search ............... 105/468, 496; 206/522; 214/10.5 D

[56] References Cited

U.S. PATENT DOCUMENTS

| | | | |
|---|---|---|---|
| 1,744,719 | 1/1930 | Berry et al. | 206/527 X |
| 2,674,206 | 4/1954 | Scott | 105/468 |
| 3,199,689 | 8/1965 | Feldkamp | 105/468 |
| 3,556,318 | 1/1971 | Hollis | 214/10.5 D |
| 3,944,084 | 3/1976 | Reeves | 105/468 X |
| 3,960,281 | 6/1976 | Reeves | 105/468 X |

Primary Examiner—Albert J. Makay
Assistant Examiner—Howard Beltran
Attorney, Agent, or Firm—Hill, Gross, Simpson, Van Santen, Steadman, Chiara & Simpson

[57] ABSTRACT

A dunnage bag is provided with integral tie-down loops used with strapping to secure the bag to freight pallets or to a vehicle to prevent shifting of the bag with respect to the load to be protected by the bag. Each tie-down has an anchor portion received within the bag adjacent inflatable bladder therein and a loop portion extending exteriorly of the bag from the anchor portion for engagement with a rope or strap connected to a fixed point.

17 Claims, 6 Drawing Figures

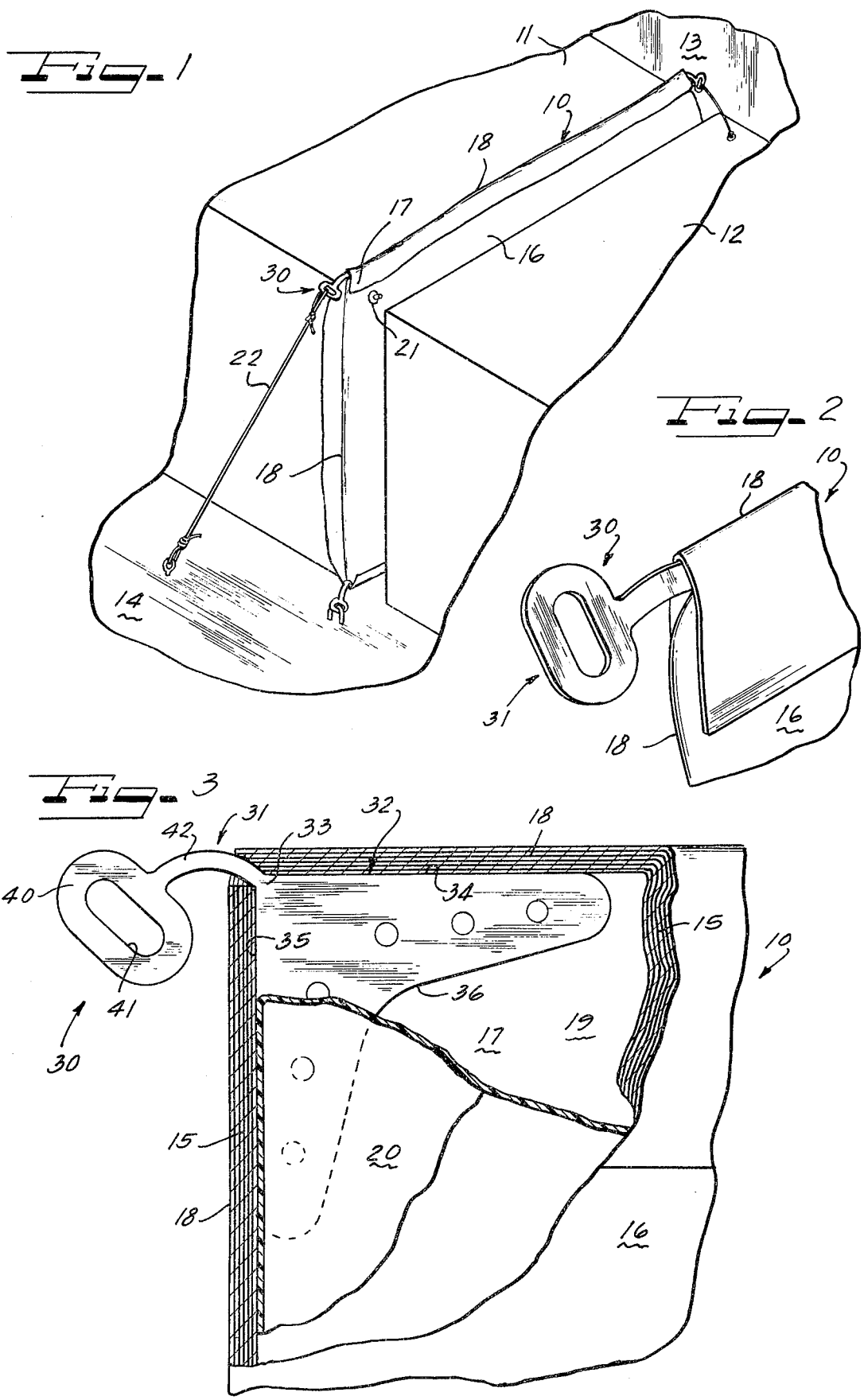

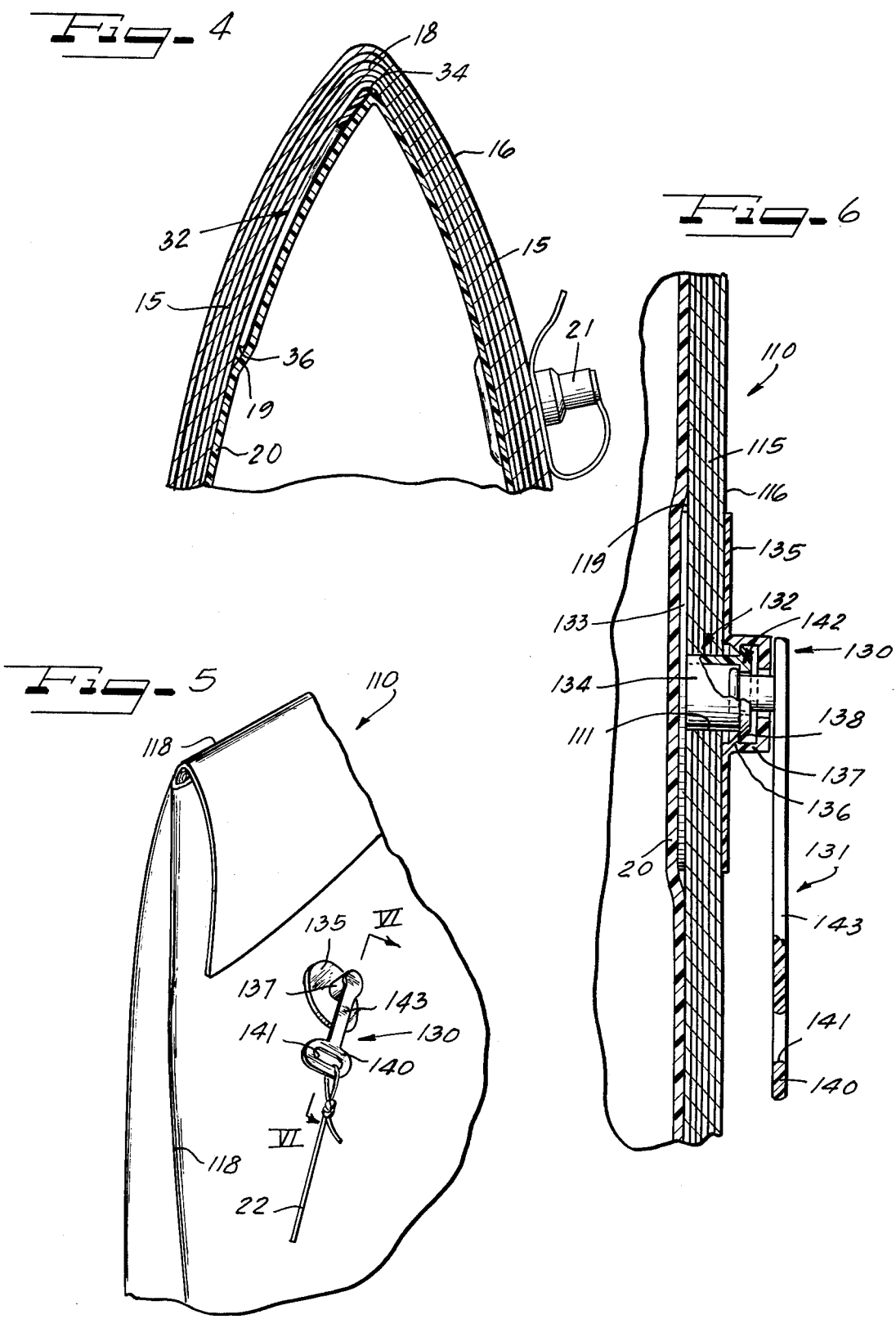

INFLATABLE DUNNAGE WITH TIE-DOWNS

BACKGROUND OF THE INVENTION

1. Field of the Invention

The present invention relates generally to paper-plastic dunnage bags.

2. The Prior Art

The state of the art is represented by Robert L. Reeves U.S. Pat. Nos. 3,944,084 and 3,960,281.

SUMMARY OF THE INVENTION

Dunnage bags are regularly used between containers or pallets of freight in transportation vehicles to prevent shifting of the freight while in transit. The bags occasionally have a tendency to ride up or work out of position in the load when vibration and shifts of attitude of the vehicle occur in transit.

In accordance with the principles of the present invention, an inflatable dunnage bag, comprising multiple plies of puncture-resistant sheet material such as paper folded into a rectangular form and containing therein a pneumatically inflatable bladder, has a tie-down device affixed to and through the plies thereof. The tie-down comprises an anchor portion received within the bag and a loop portion attached to the anchor portion and bearing a loop at an end thereof outside the bag. The tie-down device is constructed from a flexible plastic material resistant to tearing and may, for instance, be injection-molded.

Since inflatable, disposable dunnage is designed and priced for one-time use, to be slashed open and discarded after arrival at a destination, the present invention provides tie-downs which are inexpensive when used and yet can be securely attached to the bag without requiring substantial alteration in the structure of the bag. The tie-downs of the invention also avoid interference with the bladder thereby minimizing punctures therein during or after inflation.

In one embodiment adapted for corner installation, the tie-down device comprises a flat, unitary member the anchor portion of which has two outer edges formed at right angles to one another to be received in and engage two edges of the bag and the loop portion of which has an extended shank portion extending through the plies of the bag at the corner.

In a second embodiment the anchor portion comprises one or two bearing plates surrounding an aperture formed through a side of the bag near a corner, an inner one of the plates being adjacent the bladder and an optional outer plate engaging the outside of the bag, with a stud portion joining the two plates through an aperture in the bag. The loop portion attaches to the outside of the anchor portion at the stud and may be integral with the outer plate.

BRIEF DESCRIPTION OF THE DRAWINGS

FIG. 1 is a fragmentary perspective view showing a dunnage bag embodying the principles of the present invention.

FIG. 2 is an enlarged fragmentary perspective view showing in detail a corner of the bag of FIG. 1.

FIG. 3 is a side sectional view through a corner of the bag of FIG. 1 with the bladder partially cut away to show additional details of the tie-down structure.

FIG. 4 is a cross-sectional end view through the dunnage bag and tie-down device.

FIG. 5 is a general perspective view of a corner of a dunnage bag constructed in accordance with the principles of the invention but using a different form of tie-down than FIGS. 1-4.

FIG. 6 is a sectional view on line VI—VI of FIG. 5 showing in cross-section details of the construction of the tie-down device of FIG. 5.

DESCRIPTION OF THE PREFERRED EMBODIMENTS

A dunnage bag 10 is shown in FIG. 1 employed between freight pallets or containers 11 and 12 in a transportation vehicle having a wall 13 and a floor 14. The dunnage bag 10 is constructed of a plurality of plies 15 of heavy duty paper folded into a hollow, rectangular pillow-shaped configuration generally similar to that described and illustrated in the U.S. Pat. Nos. 3,944,084 and 3,960,281 of Robert L. Reeves. As thus folded, the bag 10 has an outer surface 16, corners 17, peripheral edges 18, and an inner surface 19, as shown in the drawing figures. Provided within the bag 10 and the paper plies 15, within the inside surface 19 thereof, is a plastic bladder 20 which is inflatable with pressurized air through a one-way valve 21.

In use, the bag 10 is inserted between the freight pallets 11 and 12 in a residual space which may occur therebetween and which is desirably eliminated by means of damage. It is inflated by means of an air hose (not shown) connected temporarily to the valve 21 expanding the bag 10 and providing an outward force of 5 or 6 psi over the entire outer surface 16 of the bag 10 between the freight pallets 11 and 12. The valve 21 maintains the bag 10 in its inflated position during shipment. At the destination, the bag 10 and its bladder 20 may be punctured or slashed open to allow air within the bag 10 to escape rapidly. The bag 10 is then withdrawn from the space between the pallets 11 and 12 and discarded.

In shipping some types of freight pallets it has been found that bags 10 have a tendency to "ride up" or "work out" of position in the load when a vibration or bumping of railcars or trucks occur while in transit. That action is due to the characteristics of the loading, method of loading or type of package used.

In order to secure the dunnage bag in position, it is contemplated by the present invention that a specific tie-down means be provided as an integral part of the dunnage bag. As shown in FIGS. 1-4, the bag 10 is provided at one or more corners 17 or other locations thereof with strong but inexpensive tie-down devices 30 or as shown in FIGS. 5 and 6 at 130.

Generally, the tie-down means 30 or 130 constitutes a first abutment or anchoring portion adapted to be locked to the bag interiorly thereof, thereby to resist withdrawal and separation from the bag and a second eye portion extending outwardly of the bag exteriorly thereof for engagement with a line or securement.

In accordance with the principles of the present invention, each tie-down device 30 or 130 has a loop portion extending from the surface 16 of the bag 10, the loop portion having an expanded distal end with an aperture formed therein for receiving a rope or strap 22. An anchor portion is received within the bag 10 and engages the loop portion.

As shown in FIGS. 1-4, a first embodiment of the tie-down device 30 is received in the bag 10 at a corner 17 thereof. With slight modifications, the tie-down 30 could also be adapted to mount through a single edge of the bag 10, as midway between two corners thereof.

The tie-down device 30 is shown in plan form in FIG. 3, conveniently stamped from a flat sheet of plastic. The device 30 comprises a loop or hook portion 31 extending outside the bag 10 and forms an eye so that the shipper can use strapping to fasten the bag to the floor of the vehicle, pallet or other support. An anchor portion 32 is received within the bag 10 at a corner 17 thereof adjoining the inner surface 19 of the bag 10 and two edges 18 thereof. The anchor portion 32 also contacts the bladder 20, along one flat side thereof, as shown in FIG. 4. The anchor portion 32 is joined unitarily at 33 with the loop portion 31 and has edges 34 and 35 formed at right angles to one another and forming abutment surfaces which angularly intersect one another and are adapted to engage adjoining edges 18 of the bag 10 at interior surfaces 19 thereof. An opposite edge 36 of the anchor portion 30 is smoothly curved to avoid concentration of stresses upon either the material of the plies 15 of the bag or the bladder 20. Although the anchor is shown located adjacent the bladder 20 in the bag, the anchor may also be placed between two plies 15 of the bag with only slight loss of strength of the assembly.

The loop portion 31 has an expanded distal end 40 with an aperture 41 formed therein for receiving the strap or rope 22 or a hook attached thereto. The end 40 is smoothly joined to a shank portion 42 which extends through the plies 15 of the bag 10 to avoid concentration of tensile or tearing forces.

The form of the invention is not, however, limited to the specific structure as shown. The anchor portion 32 could be constructed in a round form or any other form engageable with an interior surface 19 of one or more edges 18 of the bag 10, so long as tie-down forces are effectively transferred from the loop portion 31 to the structure of the bag 10. The loop portion 31 similarly may be formed in any manner conveniently attachable with a means for restraining movement of the bag 10. The tie-down 30 may also be formed in two pieces for easy assembly in a partially-completed bag.

FIGS. 5 and 6 disclose a second embodiment of the present invention. The dunnage bag 110 is identical to the dunnage bag 10 of FIGS. 1–4 except that an aperture 111 is provided through the paper plies 115 of the bag between inner surface 119 and outer surface 116 thereof away from the edges 118 of the bag.

In this second embodiment, the tie-down device 130 is formed in at least two pieces for assembly through the aperture 111. An anchor portion 132 formed by a grommet has a plate 133 to engage the inner surface 119 of the bag 110 about the aperture 111, and has a stud portion 134 extending through the aperture 111 and the plies 115 thereabout. The inner plate 133 of the anchor 132 lies between the plastic bladder 20 and the inner surface 119 of the paper plies 115. An outer plate 135 engages the outer surface 116 of the bag 110 about the aperture 111, and is locked to the outer end of the stud 134 by means of an inwardly-extending annular rib 136 formed on the inner surface of a raised center portion 137 of the outer plate 135 and a raised lip 138 about the exterior of the outer end of the stud 134.

In order to lock the two-piece construction together male and female latch or detent means are provided therebetween. For example, the ribs 136 and 138 may be formed as simple circular ribs or the parts 134 and 137 may be formed with cooperating screw threads. The second part comprises a loop portion 131 having an enlarged distal end 140 with an aperture 141 formed therein to receive the strap or rope 22. It is attached to the anchor assembly 132 by means of a snap joint 142 formed on a shank portion 143 of the loop portion 131 opposite the distal end 140, a male portion 144 of the joint 142 being receivable in a recess in the end of the stud 134.

The assembly 131, 135, and 137 could be provided as a single piece if desired. Also, the outer plate portion 135 may be of any selected size since the tie-down assembly 130 will be held in place by the stud 134 and the inner plate 133 which is captured between the plastic bladder 20 and the inner surface 119 of the paper plies 115.

Although minor modifications may be suggested by those versed in the art, it should be understood that I wish to embody within the scope of the patent warranted hereon all such modifications as reasonably and properly come within the scope of my contribution to the art.

What I claim is:

1. An inflatable dunnage bag comprising:
    multiple plies of puncture-resistant sheet material folded into a rectangular form with four corners and four edges, and inner and outer surfaces;
    a pneumatically inflatable bladder contained within said bag adjoining said inner surface thereof; and
    a tie-down device made of flexible plastic affixed to said plies of said bag and provided as an integral part of the bag, said tie down device comprising,
        a first, enlarged anchor portion received within said bag, and
        a second, enlarged loop portion attached to said anchor portion within said bag, bearing a loop at a distal end thereof outside said bag, and having a reduced portion extending through the plies of the bag,
    whereby said dunnage bag may be tied down in place by a rope through said loop to prevent shifting of the bag with respect to freight and a vehicle in which the bag is employed.

2. An inflatable dunnage bag as defined in claim 1, wherein said anchor portion is received in said bag adjoining said bladder.

3. An inflatable dunnage bag as defined in claim 1, wherein said tie-down device is composed of a flexible plastic resistant to tearing.

4. An inflatable dunnage bag as defined in claim 1, wherein:
    said anchor portion of said tie-down device comprises a flat member having an outer edge; and
    said loop portion being formed at the end of a shank portion formed by said reduced portion and extending through said plies of said bag.

5. An inflatable dunnage bag as defined in claim 4, wherein said anchor portion has two outer edges at right angles to each other and said loop portion attaches to said anchor portion at an intersection of said outer edges.

6. An inflatable dunnage bag as defined in claim 1, wherein said anchor portion of said tie-down device comprises:
    an inner bearing plate surrounding an aperture formed through said plies of one side of said bag, and lying adjacent said bladder; and wherein said reduced portion comprises a stud portion engaged with said inner plate and extends through the aperture and through the plies of the bag.

7. An inflatable dunnage bag as defined in claim 6, wherein:
   said inner plate and said stud portion are formed as a unitary assembly; and
   said loop portion engages said stud outside said bag.

8. An inflatable dunnage bag as defined in claim 6, further comprising an outer bearing plate engaging the outside of said bag about said aperture.

9. In an inflatable dunnage bag formed of multiple overlying plies of paper folded into a rectangular configuration having edges, two sides, corners, and an inner and an outer surface and having an inflatable plastic bladder contained in said plies, a tie-down device provided as an integral part of said bag comprising:
   an anchor portion received within said bag beneath an aperture formed through said plies;
   a connector portion attached to said anchor portion and extending through said aperture; and
   a loop portion attached to said connector portion outside said bag, said loop portion being adapted to receive a strap or a rope.

10. In an inflatable dunnage bag as defined in claim 9, said tie-down device being further defined by said anchor portion thereof being received adjacent said bladder and bearing upon said inner surface of said plies.

11. In an inflatable dunnage bag as defined in claim 9, said tie-down device being further defined by said anchor portion, said connector portion, and said loop portion being formed in a unitary, substantially flat piece, and by said anchor portion having an edge adapted to bear against at least one of said edges of said bag.

12. In an inflatable dunnage bag as defined in claim 9, said tie-down device being further defined by:
   said anchor portion comprises an inner plastic plate received upon one of said inner surfaces of said bag;
   said connector portion comprises a stud extending normally from said inner plate to an outer end; and
   said loop portion includes means engaging said outer end of said stud.

13. In an inflatable dunnage bag as defined in claim 12, said tie-down device further comprising a reinforcement plate received upon said stud and beneath said loop portion and engaging said outer surface of said bag about said stud.

14. For use in a dunnage bag, tie-down means comprising:
   a first anchor portion located interiorly of the bag and integrating the tie-down means in firm assembly with the bag,
   a second eye portion exteriorly of the bag and forming an eye through which may be connected and attached a line or securement for holding the bag against ride up and work out and
   a reduced-diameter portion operatively connecting the first and second portions and extending through a wall of said bag.

15. The invention defined in claim 14 wherein said tie-down means further comprises:
   said first anchor portion being adapted to be fitted in a corner of the bag and having angularly intersecting abutment surfaces for engaging adjoining edges of the bag interiorly of the bag, and
   said second eye portion comprising a loop for attachment to strapping,
whereby the bag may be secured to the support surface with which it is used.

16. The invention defined in claim 14 wherein said tie-down means is further defined by:
   said first anchor portion is formed by a grommet secured in firm assembly to the bag,
   said second portion comprises a loop, and interfitting detent means are provided between the first and second portions so that the loop may be attached by strapping to a support surface to hold down the bag.

17. In combination,
   a dunnage bag having multiple outer plies of paper and an inner ply of plastic forming an inflatable bladder, and
   a plurality of tie-down means each comprising,
      a first anchor portion interiorly of said bag secured within the outer plies of paper,
      a joining portion having first and second ends and connected at one end to said first portion inside said bag and at a second end to a second, eye portion, and
      said second eye portion located exteriorly of said bag and forming a loop for attachment to strapping means for holding the bag in place.

* * * * *